July 11, 1950

J. R. WIRT ET AL 2,515,106

WELDING MACHINE

Filed May 21, 1948

INVENTORS
John R. Wirt and Wayne H. Shely
BY
Spencer Hardman & Fehr
their attorneys

INVENTORS
John R. Wirt and Wayne H. Shirley
BY
Spencer Hardman and Faber
their attorneys

Patented July 11, 1950

2,515,106

UNITED STATES PATENT OFFICE 2,515,106

WELDING MACHINE

John R. Wirt and Wayne H. Sheley, Anderson, Ind., assignors to General Motors Corporation, Detroit, Mich., a corporation of Delaware Application May 21, 1948, Serial No. 28,366

15 Claims. (Cl. 219—4)

This invention relates to the manufacture of horns for automotive vehicles, more particularly the type of horn disclosed in the copending application of White and Brundage, Serial No. 80,-854, filed March 11, 1949. In the manufacture of this horn the pole piece assembly is welded to the horn base while a predetermined gap is maintained between the armature and the pole pieces by a shim located between the armature and the pole pieces while the magnet coil is energized so that the armature will press against the shim and the shim against the pole pieces while welding takes place.

An object of the invention is to provide an apparatus by which the welding of the pole piece or magnet core to the frame takes place while current is applied to the magnet coil.

Further objects and advantages of the present invention will be apparent from the following description, reference being had to the accompanying drawings wherein a preferred embodiment of the present invention is clearly shown.

Figures 1, 2:
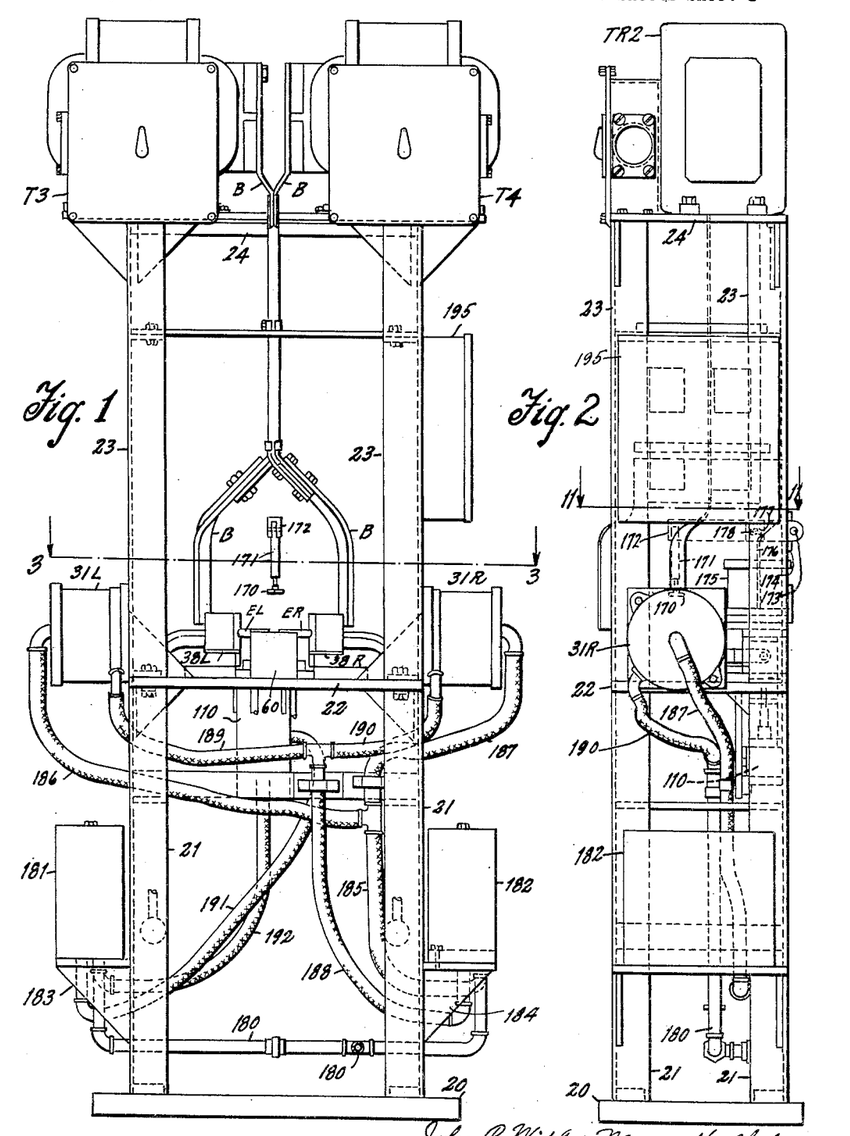
Figs. 1 and 2 are front and side views respectively of the apparatus embodying the present invention.
Figures 15, 16:
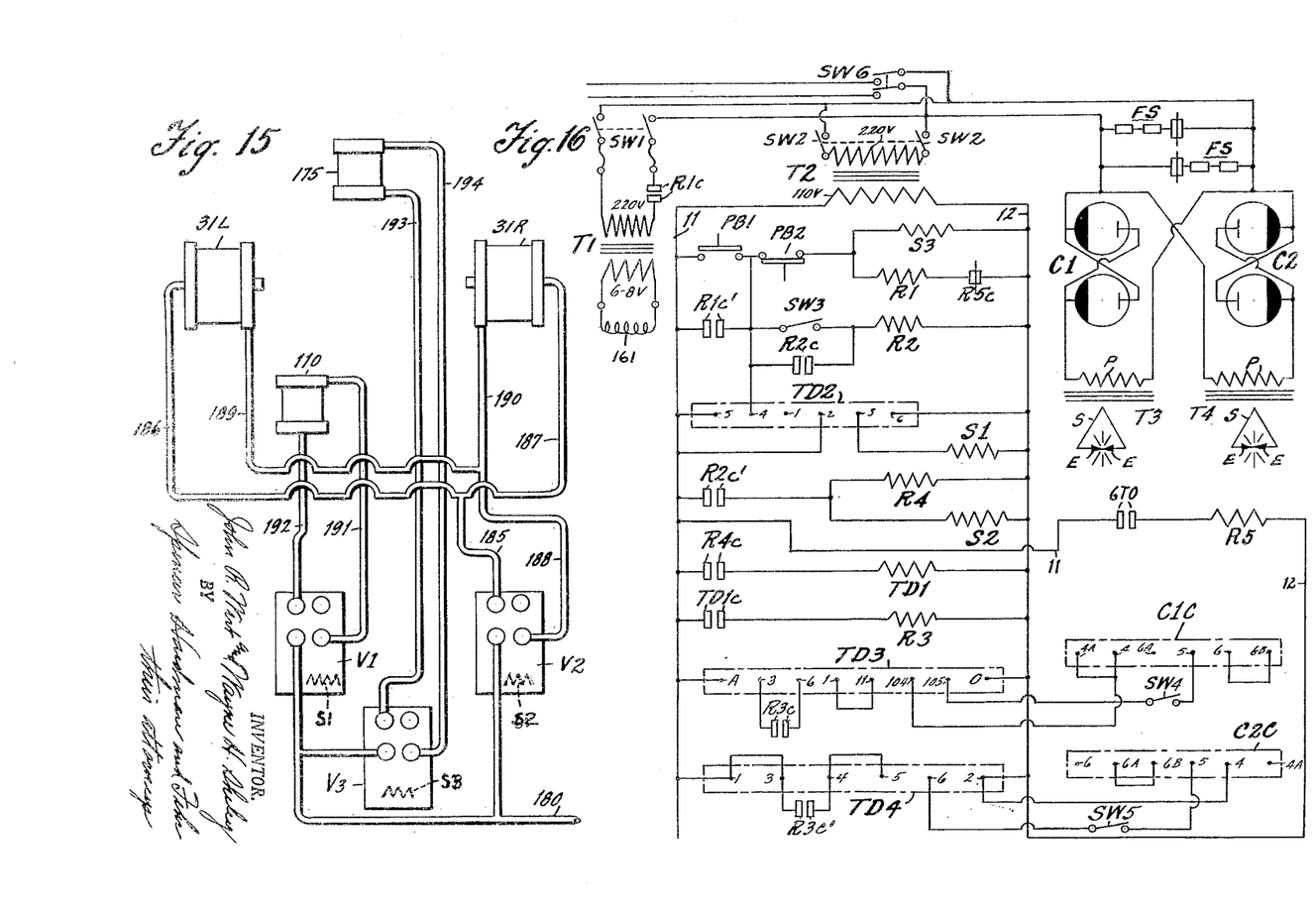
Figs. 15 and 16 are hydraulic and wiring diagrams respectively.

Referring to Figs. 1 and 2, a base 20 supports four angle posts 21 which at their upper ends support a table 22. Table 22 supports four angle posts 23 which support a shelf 24. Shelf 24 supports welding transformer T3 and T4, shown diagrammatically (Fig. 16). Each has a primary winding P and a single loop secondary winding S connected with welding electrodes E, by suitable bus bars B (Figs. 1 and 2).

Figure 3:
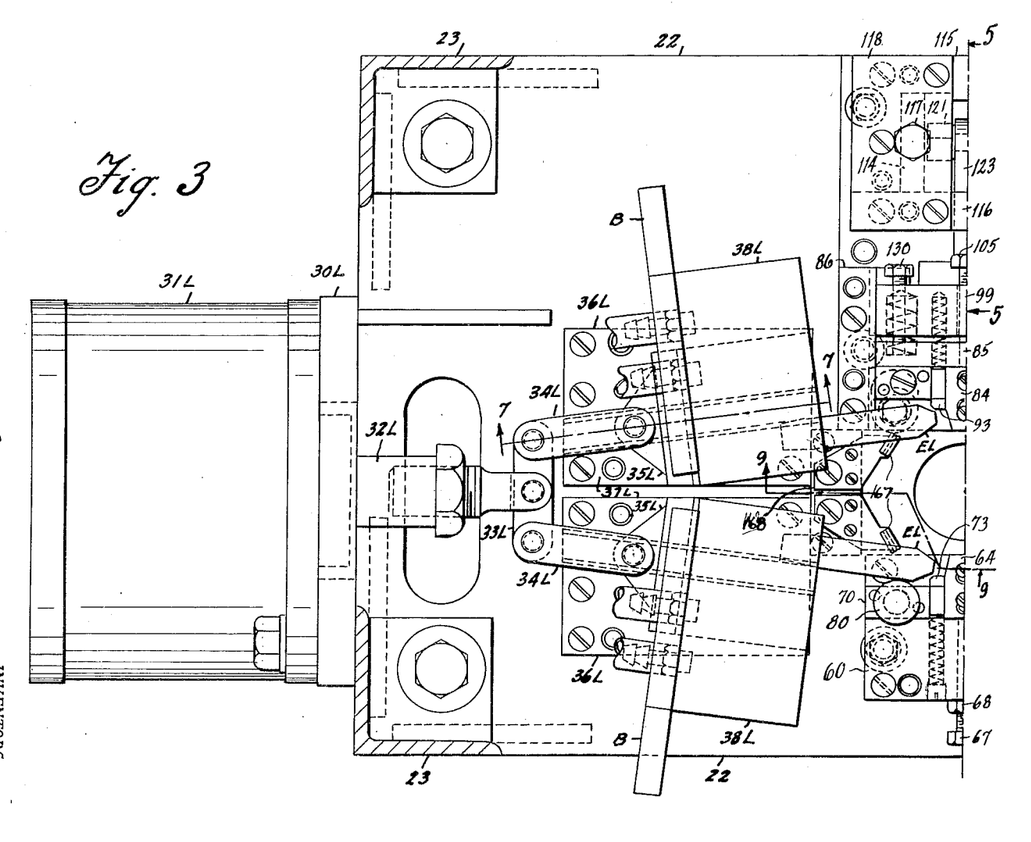
Figs. 3 and 4 together constitute a plan view of a portion of the apparatus, this view being on line 3—3 of Fig. 1.
Figure 4:
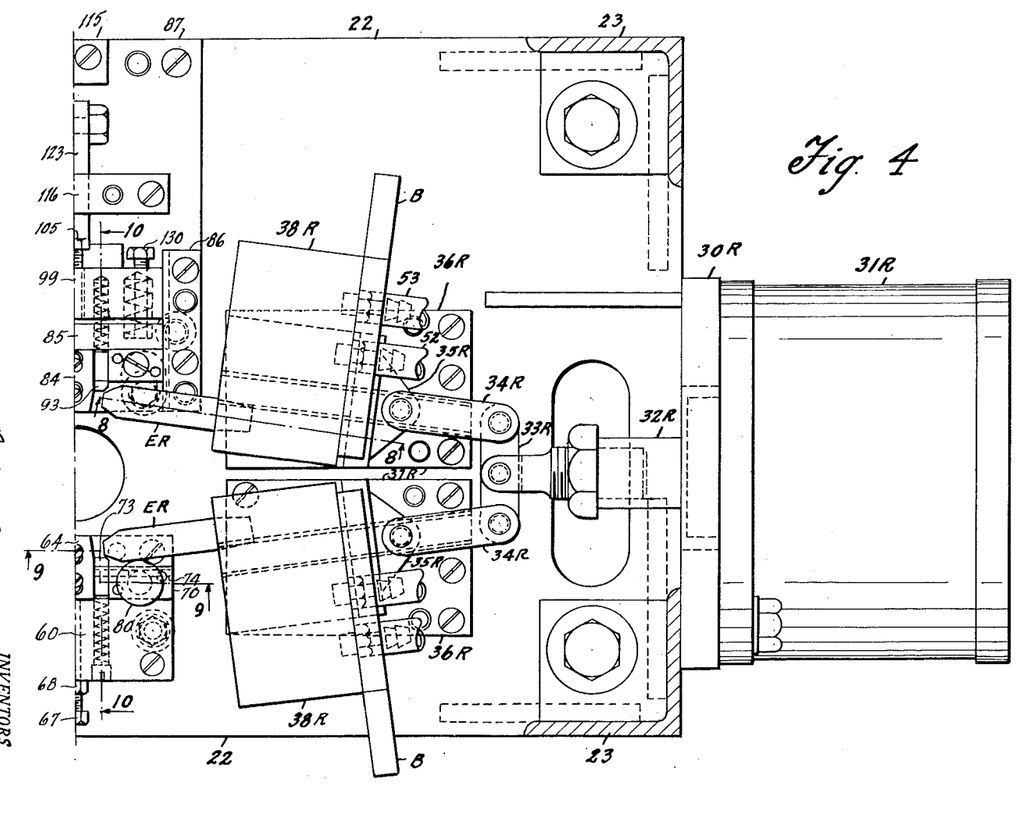
Figure 8:
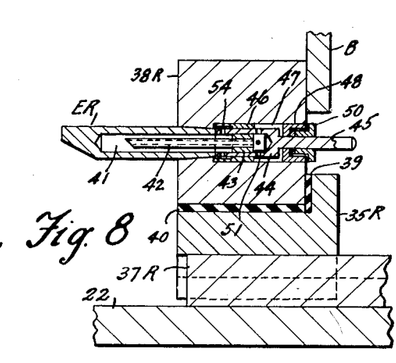
Fig. 8 is a fragmentary sectional view on the line 8—8 of Fig. 4.

Referring to Figs. 3 and 4, shelf 22 supports brackets 30L and 30R which supports cylinder 31L and 31R, whose pistons are connected respectively with rods 32L and 32R which are pivotally connected with bars 33L and 33R respectively. Links 34L and 34R connect bars 33L and 33R respectively with pairs of slides 35L and 35R respectively which are guided obliquely for movement to the horizontal (as viewed in Figs. 3 and 4) by pairs of rails 36L and 37L, and 36R and 37R respectively. Slides 35L and 36L respectively support copper electrode blocks 38L and 38R, each connected with copper bus bar B, said blocks being insulated from the slides by plates 39 and 40, as shown in Fig. 8. Blocks 38L and 38R respectively support electrodes EL and ER. The connected bars B are capable of flexing so as to allow horizontal movement of the blocks 38L and 38R.

The construction of the electrodes is the same. As shown in Fig. 8, the electrodes ER have a bore 41, which receives a water inlet tube 42 passing through a bushing 43 in a sleeve 44 having a stem 45. Sleeve 44 fits within a bushing 46 which fits within a bore 47 in block 38R. The bore 47 is closed by a stuffing box 48 receiving packing retained by a threaded plug 50. The ducts through the tube 42 are connected to side passages 51 which lead into that portion of bore 47 between the sleeve 44 and the stuffing box 48, said portion being connected with a duct in block 38R connected with a water source by a hose 52. A return hose 53 (Fig. 4) is connected with a duct in block 38R which is connected with holes 54 of sleeve 44 which communicate with the bore 41 in the electrode. Thus means are provided for the circulation of water into and out from the electrode.

Referring to Figs. 10, 12, 13 and 14, the table 22 supports a block 60 located by dowels 61 and secured by screws 62 and having a passage 63 through which water circulates. Block 60 supports a copper wedge block 64 having slots 65 through which screws 66 extend thereby guiding the block for movement of adjustment in a horizontal direction as viewed in Fig. 12. From the position shown in Fig. 12, the block 64 can be moved to the right by turning a screw 67 which is secured in the desired position by lock nut 68. Then the screws 66 are tightened upon the block 60. Block 60 supports guide block 70 attached to block 60 by locating dowels 71 and screws 72. Between the block 70 and the wedge block 64 there are located two dogs 73, each pivotally supported on a rod 74 carried by a block 70. Each dog has a tooth or point 75 for engaging a tang 162t (Figs. 9 and 10) provided by a side plate 162 of the magnet core of the horn. The dogs 73 are urged clockwise by springs 76 received by holes 77 in block 60 and retained by plugs 78.

Figure 9:
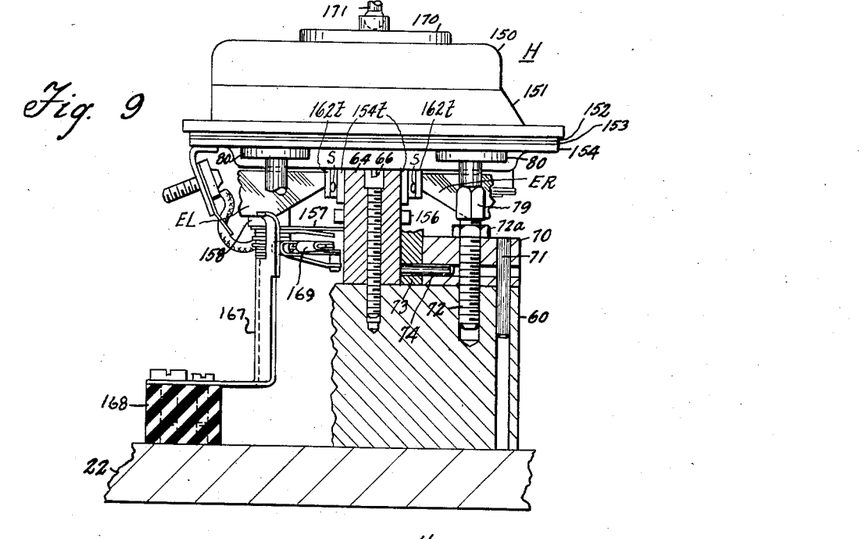
Fig. 9 is a fragmentary sectional view on the line 9—9 of Figs. 3 and 4.
Figure 10:
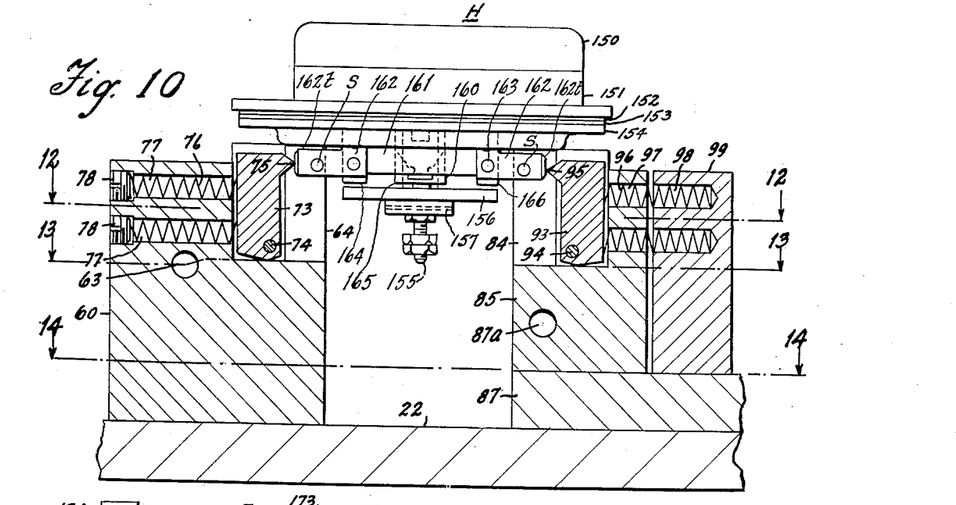
Fig. 10 is a sectional view on the line 10—10 of Fig. 4.

Referring to Fig. 9, each screw 72 has a stem 79 which terminates in a pad 80 upon which the horn base 154 rests. By turning the screw 72 the elevation of pad 80 can be adjusted and the screw 72 is secured in the desired position by a lock nut 72a. As shown in Fig. 9, the horn is placed in the welding machine with its base resting on the pads 80 at one side and with its base resting, as shown in Fig. 10, upon a wedge 84 on the other side. The horn has in effect a three point support.

Figure 12:
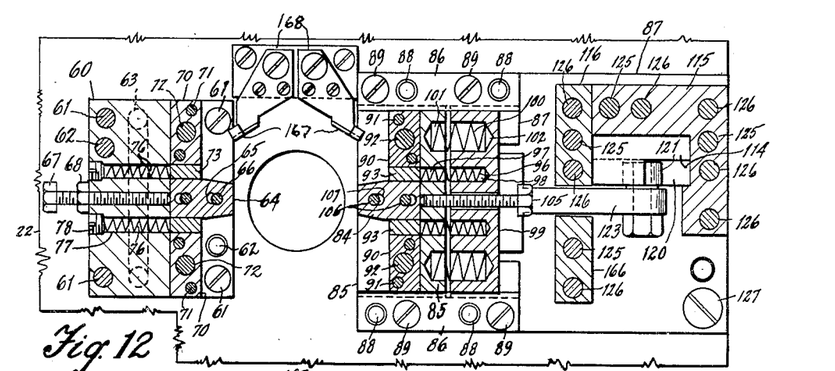
Figs. 12, 13 and 14 are sectional views taken respectively on the lines 12—12, 13—13 and 14—14 of Fig. 10.
Figure 13:
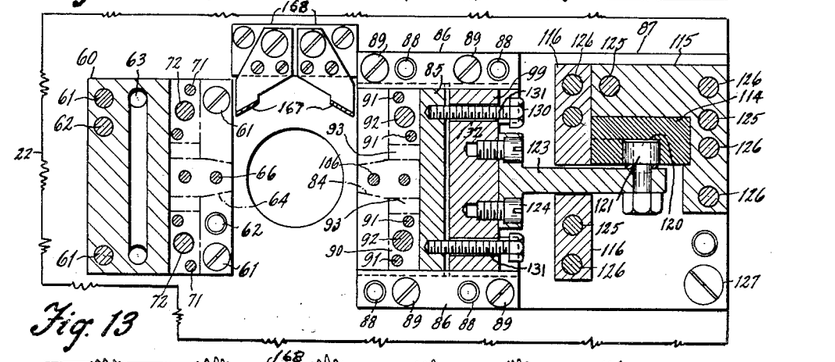
Figure 14:
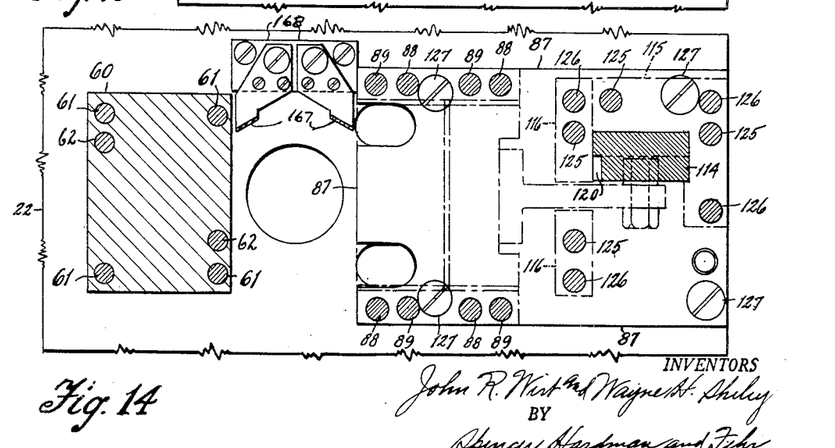

The wedge 84 (Figs. 10 and 12) is supported by a copper block 85 guided for horizontal movement as viewed in Fig. 12 by ways or rails 86 attached to a plate 87 (Fig. 10) by dowels 88 and screws 89 which also serve to secure the plate 87 to the table 22. The block 85 carries blocks 90 located by dowels 91 and screws 92 serve to attach the blocks 90 to the blocks 85. Between the edge 84 and the blocks 90 there are located dogs 93 which are similar to the dogs 73 previously described. Dogs 93 are supported by pins 94 supported by the blocks 90. Dogs 93 are urged toward the tangs 162t by springs 96 passing through holes 97 in block 85 and into recesses 98 provided by a block 99 which is supported by the plate 87 and is guided by the rails 86. By means to be described, the block 99 is moved horizontally toward the left as viewed in Fig. 12 in order to locate the wedge 84 firmly between the base tangs 154t and to force the core assembly toward the wedge 64. Motion is transmitted from the block 99 to the block 85 by springs 100 located in recesses 101 provided by plate 85 and recesses 102 provided by block 99. Wedge 84 can be adjusted relative to block 85 by turning a screw 105 passing loosely through a hole in block 99 and threaded into block 85 so as to engage the wedge 84. The wedge 84 is guided during this adjustment by screws 106 passing through slots 107 in the wedge and threaded into block 85. When the wedge has been adjusted, the screws 106 are tightened.

Figure 5:
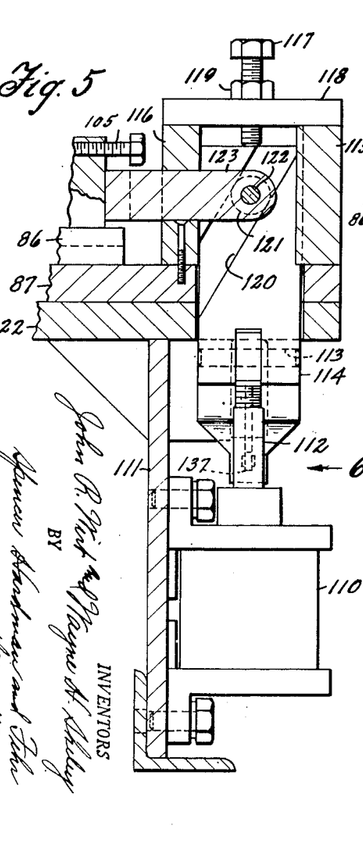
Fig. 5 is a fragmentary sectional view on the line 5—5 of Fig. 3.
Figure 6:
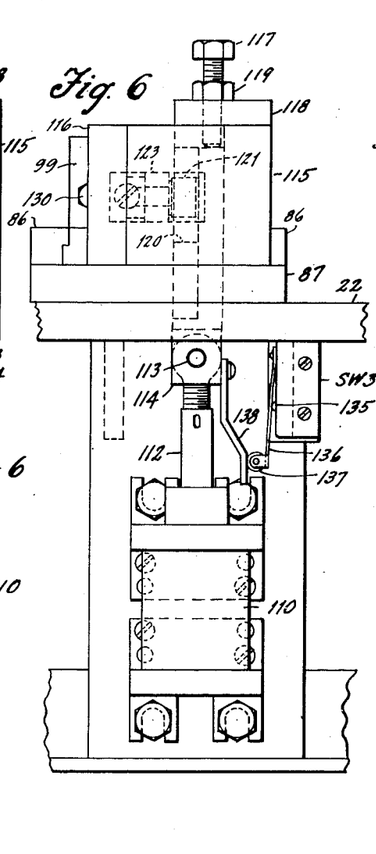
Fig. 6 is a view in the direction of arrow 6 of Fig. 5.
Figure 7:
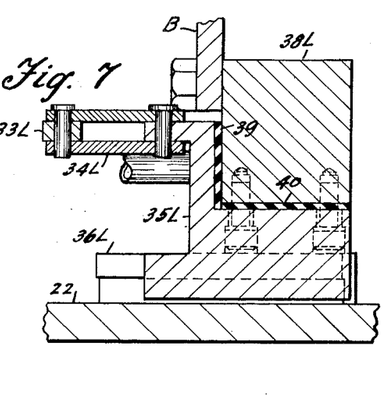
Fig. 7 is a fragmentary sectional view on the line 7—7 of Fig. 3.

The plate 99 and hence plate 85 are moved horizontally as viewed in Fig. 12 by a pneumatic servo-motor comprising a cylinder 110 supported by a bracket 111, supported by table 22. The piston in cylinder 110 is connected by rod 112 with a pivot pin 113 carried by a slide 114 guided by ways or rails 115 and 116 supported by the plate 87 which, like the table 22, is provided with an aperture through which the slide 114 extends. Upward motion of the slide 114 is limited by a screw 117 threaded through a bar 118 attached to the rails 115 and 116 and secured in the desired position of adjustment by nut 119. The slide 114 has an oblique cam slot 120 which receives a roller 121 which a pin 122 pivotally connects with a bar 123 of the T formation, said bar being attached to block 99 by screws 124. Screws 125 and dowels 126 secure the parts 115 and 116 to the plate 87 which in turn is secured by screws 127 to the table 22. When the slide 114 moves up in Fig. 5, the bar 123 moves left and motion is transmitted by springs 100 to cause block 85 to move left. When the slide 114 moves down the bar 123 moves right thereby causing the block 99 to move right and to engage the heads 130 of screws 131 which pass through holes 132 in block 99 and are threaded in the block 85. Thus the wedge 84 is positively retracted from the magnet core of the horn. During its vertical movement slide 114 operates a switch SW3 whose plunger 135 is engaged by leaf spring 136 pivotally supporting a roller 137 engageable with a cam bar 138 attached to the slide 114, as shown in Fig. 6.

Figs. 9 and 10 show the horn H in position. The horn H comprises an assembly of projector shells 150 and 151, a diaphragm 152, a gasket 153 and a base 154. The diaphragm which is welded at its edges to the base 154 is connected by a rod 155 (Fig. 10) with an armature 156 and an armature spring 157, which together with a stack of circuit breaker part terminals and insulators is attached to a shelf 158 supported by the base 154 (Fig. 9). The rod 155 extends through the magnet core 160 comprising E-shaped laminations which receive a coil 161. These laminations are bound together by side plates 162 secured by rivets 163 passing through the laminations. An air-gap spacer or shim, not shown, of predetermined thickness is placed between armature 156 and the pole pieces 164, 165 and 166 of magnet core. The coil 161 is connected with a current source, wires from which are connected respectively with two resilient fingers 167 (Fig. 9) one of which is secured to an insulating block 168 supported by the table 22. Each of these fingers 167 engages a plate 169 with which wires are connected leading to the coil 161.

Figure 11:
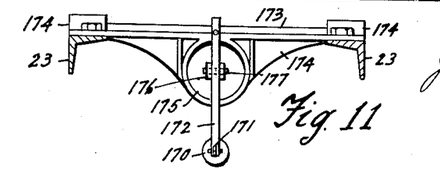
Fig. 11 is a sectional view on the line 11—11 of Fig. 2.

The horn H is located as shown in Figs. 9 and 10 with its base 154 resting on the pads 80 and on the wedge 84. The wedges 64 and 84 are located between pairs of base tangs 154t. The points 75 and 95 of the dogs 73 and 93 engage the ends of the tangs 162t provided by the core side plates 162. The frame is maintained in this position by a pad 170 pivotally attached to a rod 171 which, as shown in Fig. 2, is pivotally connected with a lever 172 which, as shown in Fig. 11, is connected with a rod 173 pivotally supported by a bracket 174 attached to the angle posts 23. Bracket 174 supports an air cylinder 175 whose piston is connected with a rod 176 whose head is provided with a slot 177 for receiving a pin 178 passing through bar 172. By admitting compressed air to the upper end of cylinder 175, rod 176 moves down and the rod 172 moves down to cause pad 170 to press against the horn to maintain it in the position shown. The magnet coil 161 is then energized to cause the shim to be tightly engaged by the armature 156 and the magnet core 160. Compressed air is then admitted to the lower end of the cylinder 110 to cause the wedge 84 (Fig. 10) to move toward the wedge 64 thereby causing the horn base tangs 154t to be tightly engaged by the wedges and causing the dogs 73 and 93 to press more tightly against the magnet core tangs 162t. The function of these dogs is to restrain vertical movement of tangs 162t. Compressed air is admitted to the left end of cylinder 31—L and to the right end of cylinder 31—R in order to cause the electrodes EL to move right and electrodes ER to move left in order to urge the tanges 162t of the magnet core assembly against the tangs 154t of the horn base 154. Whiffletree bars 33—L and 33—R provide for equalization of pressure. Each of the tangs 162t has a spherical projection S which at first engages a tang 154t causing the welding current to be concentrated in a small area whereby the temperature of the projection S is quickly raised by the welding current. As this projection S melts down the electrodes move in to force the tangs 162t against the tangs 154t thereby completing the assembly of the horn base and the horn magnet core while the gap between the horn armature and the pole faces is accurately maintained under pressure exerted magnetically between the armature and the pole faces.

There are two welding circuits. One includes the secondary of one of the welding transformers, the electrodes EL and ER which are upper as viewed in Figs. 3 and 4 and the tangs and the wedge 84 between them. The other includes the secondary of the other welding transformer, the electrodes EL and ER, which are lower as viewed in Figs. 3 and 4 and the tangs and the wedge 64 between them.

Fig. 15 is a hydraulic diagram showing the connections between various air cylinders and their control valves and the latter with a pipe 180 connected with a compressed air source. Pipe 180 is connected with the valve V2 which controls the flow of compressed air to the ends of cylinders 31—L and 31—R, with a valve V1 which controls the flow of compressed air to the cylinder 110 and with a valve V3 which controls the flow of compressed air to the cylinder 175. These valves are located in boxes 181 and 182 supported by shelves 183 and 184, respectively supported by the posts 21. The connections between valve V2 and the remote ends of cylinders 31—L and 31—R are provided by hose 185 and branch hoses 186 and 187. Valve V2 is connected with the adjacent ends of these cylinders by a hose 188 connected with branch hoses 189 and 190. Cylinder 110 is connected with its valve V1 by hoses 191 and 192. As shown diagrammatically in Fig. 15, the cylinder 175 is connected with its control valve V3 by pipes 193 and 194.

The box 195 which is supported by posts 23, houses electrical control apparatus which will now be described with reference to Fig. 16.

A switch SW6, when closed, connects a 220 volt A. C. source with ignitrons C1 and C2 and flow switches FS. Ignitrons C1 and C2 control the flow of current to the primaries P of the welding transformers T3 and T4. Switch SW1, when closed, connects switch SW6 with the primary of a transformer T1 connected with one pole of switch SW1 by normally open contacts R1c of a relay having a magnet coil R1. The secondary of transformer T1 is connected with the horn magnet coil 161 by the members 167 (Fig. 9).

A switch SW2, when closed, connects switch SW6 with the primary of a transformer T2 whose secondary is connected with wires 11 and 12. PB1 is a normally open starting switch. PB2 is a normally closed stopping switch. S3 is the magnet coil which, when energized, causes the valve V3 to operate to cause the clamp pad 170 to engage the horn. R1 is the magnet coil of a relay having normally open pairs of contacts R1C and R1C'. SW3 is the switch which is closed when the piston rod 112 (Fig. 6) rises. R2 is the magnet coil of a relay having normally open pairs of contacts R2C and R2C'. TD2 is a vacuum tube time delay relay, for example one known to the trade as CR7504—A1D having the terminal indicated with the dot-dash rectangle marked TD2. S1 is the magnet coil which, when energized, causes valve V1 to operate to cause the wedge 84 to move toward the wedge 64. R4 is the magnet coil of a relay having normally open contacts R4C. S2 is the magnet coil which, when energized, causes valve V2 to operate to cause the electrodes EL and ER to move against the work. TD1 is the magnet coil of a magnetic time delay relay having normally open contacts TD1c. R3 is the magnet coil of a relay having normally open pairs of contacts R3c which respectively control TD3 and TD4. TD3 is a NEMA—1A welding sequence timer having terminals indicated with the dot-dash rectangle which represents this timer. TD3 controls the closing of normally open contacts 6TO, the closing of which causes energization of magnet coil R5 of a relay having normally closed contacts R5c. Switch SW4 connects TD3 with C1C which is an ignition contactor which controls ignitron C1. TD4 is a NEMA—1A welding timer having the terminals indicated within the dot-dash rectangle which represents it. TD4 is connected by switch SW5 with C2C which is an ignitron contactor which controls ignitron C2.

The sequence of operations is as follows. The horn to be welded is mounted in the machine as described with the gap determining spacer or shim between its armature and magnet pole faces. Power is applied by closing switches SW6, SW1 and SW2. Switch PB1 is momentarily closed. Coil R1 is energized and closes contacts R1C which causes current to flow to horn magnet coil 161, thereby holding the spacer between the armature and magnet core by magnetic attraction. Coil S3 is energized to cause the clamp pad 170 to engage the horn. The other contacts R1C' close to by-pass switch PB1 so that R1 remains energized after PB1 opens. TD2 starts timing. When TD2 times out, magnet coil S1 is energized and the piston rod 112 (Fig. 6) moves up and switch SW3 closes and the wedge 84 moves in and forces itself between the adjacent frame tangs 154t and the frame tangs 154t remote therefrom against the wedge 64.

When SW3 closes, coil R2 is energized and contacts R2c and R2c' close. R2c maintains energization of coil R2. Energization of R4 and S2 is effected by closing of RC2'. S2 then causes valve V2 to operate to cause the electrodes EL and ER to move in against the work. R4 causes contacts R4c to close to energize TD1 which after a certain time (the duration of which is called squeeze time) closes contacts TD1C which energizes relay coil R3 which closes contacts R3c and R3c' which cause TD3 and TD4 to operate. TD3 operates through C1C to cause ignitrons C1 to pass current to the primary of transformer T3. TD4 operates through C2C to cause ignitrons C2 to pass current to the primary of transformer T4.

TD4 times out and stops current through C2. The weld control section of TD3 times out and stops current through C1. Welding current ceases while the electrodes are still forced against the work. After the lapse of hold time, the hold section of TD3 times out and contacts 6TO are caused to close. Relay coil R5 is energized and normally closed contacts R5c open. Coil R1 is deenergized and R1c opens to disconnect the horn magnet coil 161, and R1c' opens to disconnect coil R2. Coil R2 is deenergized and contacts R2c and R2c' open. Coil R4 is deenergized and contacts R4c open. TD1 is deenergized and contacts TD1c open. Coil R3 is deenergized and contacts R3c and R3c' open. The circuit is reset or restored to normal condition for another cycle which is initiated by momentarily closing switch PB1.

The cycle can be stopped at any time by opening switch PB2.

While the embodiment of the present invention as herein disclosed, constitutes a preferred form, it is to be understood that other forms might be adopted, all coming within the scope of the claims which follow.

What is claimed is as follows:

1. Apparatus for welding an electromagnet assembly including a coil and a core having pairs of spaced tangs at opposite ends thereof to a base having pairs of spaced tangs on opposite sides of a central region comprising, means for supporting the base and the core loosely assembled therewith with the core tangs straddling the base tangs; two wedges each adapted to occupy the space between one pair of base tangs; means for energizing the coil to clamp an air-gap spacer between the core and an armature supported by the base; means for effecting relative movement between the wedges in a direction to cause the base tangs to be engaged tightly by the wedges; electrodes engaging the core tangs; means for forcing the electrodes against the core tangs and the latter against the base tangs; and means for supplying electric current to the electrodes to effect a weld between the tangs.

2. Apparatus according to claim 1 having means for clamping the base assembly upon the base supporting means.

3. Apparatus according to claim 1 having means for restraining movement of the core relative to the base while the coil is energized and the electrodes are caused to move against the core tangs.

4. Apparatus according to claim 1 having dogs pivotally supported by the wedges and each having a tooth for engaging the end of a core tang for restraining movement of the core relative to the base while the coil is energized and the electrodes are caused to move against the core tangs.

5. Apparatus according to claim 1 in which the support for the base comprises one of the wedges and two pads located adjacent opposite sides of the other wedge.

6. Apparatus according to claim 1 in which the coil is connected with terminal members which respectively engage spring conductors when the base is placed on the support, and the energization of the coil is effected by connecting the spring conductors with a current source.

7. Apparatus according to claim 1 in which the four core tangs are forced respectively by four electrodes respectively against four base tangs which respectively contact the four side surfaces of the two wedges and electric current is applied to the electrodes by the provision of two welding transformers each having a primary coil connected with a current source and a secondary winding in series with electrodes on opposite sides of a wedge, a wedge and the core and base tangs located between the electrodes and wedge.

8. Apparatus according to claim 1 in which the four electrodes are arranged in two pairs on opposite sides of the wedges and each pair is moved by a common operating member mechanically connected with the electrodes of the pair by means which will equalize the pressures applied by the electrodes.

9. Apparatus for welding an electromagnet assembly including a coil and a core having pairs of spaced tangs at opposite ends thereof to a base having pairs of spaced tangs on opposite sides of a central region; means for supporting the base and the core loosely assembled therewith with the sore tangs straddling the base tangs; a stationary wedge adapted to occupy the space between one pair of base tangs; a movable wedge adapted to occupy the space between the other pair of base tangs; means for energizing the coil to clamp an air-gap spacer between the core and an armature supported by the base; means for actuating the movable wedge in a direction to cause the base tangs to be engaged tightly by the wedges; electrodes engaging the core tangs; means for forcing the electrodes against the core tangs and the latter against the base tangs; and means for supplying electric current to the electrodes to effect a weld between the tangs.

10. Apparatus for welding an electromagnet assembly including a coil and core having pairs of spaced tangs provided with spherical projections at opposite ends thereof to a base having pairs of spaced tangs on opposite sides of a central region; means for supporting the base and the core loosely assembled therewith with the core tang projections straddling the base tangs; a stationary wedge to occupy space between one pair of base tangs; a movable wedge adapted to occupy the space between the other pair of base tangs; means for engaging the coil to clamp an air spacer between the core and an armature supported by the base; means for actuating the movable wedge in a direction to cause the base tangs to be engaged firmly by the wedges; electrodes engaging the core tangs; means forcing the electrodes against the core tangs until the projections engage the base tangs; and means for applying electric current to the electrodes causing the projections to melt and to effect a weld between the tangs.

11. Apparatus for welding an electromagnet assembly including a coil and core having pairs of spaced tangs provided with spherical projections at opposite ends thereof to a base having pairs of spaced tangs provided with spherical projections on opposite sides of a central region; means for supporting the base and the core loosely assembled therewith with the projections of the core tangs straddling the projections of the base tangs; a stationary wedge adapted to occupy the space between one pair of base tangs; a movable wedge adapted to occupy the space between the other pair of base tangs; means for energizing the coil to clamp an air gap spacer between the core and an armature supported by the base; means for actuating the movable wedge in a direction to cause the base tangs to be engaged tightly by the wedges; electrodes engaging the core tangs; means for forcing the electrodes against the core tangs until the projections therein make point contact engagement with the projections of the base tangs; and means for supplying electric current to the electrodes to fuse the projections.

12. Apparatus for use in welding an electromagnet assembly including a coil and a core having pairs of spaced tangs at opposite ends thereof to a base having pairs of spaced tangs on opposite sides of a central region comprising, a support for the base with the core loosely mounted on the base, a plurality of wedges adapted to abut the base tangs; means for moving one of the wedges so that all of the wedges will be in abutting relation with respect to base tangs; means for engaging the coil to clamp an element between the core and an armature supported by the base to provide the correct air gap therebetween; a plurality of electrodes adapted to engage the core tangs; means for forcing the electrodes against the core tangs so as to clamp the core and base tangs between the electrodes and the wedges; means for connecting the electrodes with a current source to weld the core tangs to the base tangs; and a system of control for effecting the operations of said means in timed relation.

13. Apparatus for use in welding an electromagnet assembly including a coil and a core having pairs of spaced tangs at opposite ends thereof to a base having pairs of spaced tangs on opposite sides of a central region comprising, means for supporting the base and the core loosely assembled therewith with core tangs adjacent base tangs; a plurality of wedges adapted to abut the base tangs; means for moving at least one of the wedges whereby all of the wedges will be in abutting relation with respect to the base tangs; means for clamping the base upon the supporting means; means for effecting the energization of the electromagnet coil to clamp an air gap spacer between the core and an armature supported by the base; a plurality of electrodes adjacent the core tangs; means for advancing the electrodes against the core tangs and the latter against the base tangs; means for connecting the electrodes with a current source to effect a weld between the core tangs and base tangs; and a system of control for effecting the operation of all said means in timed relation.

14. Apparatus for welding an electromagnet assembly including a coil and a core having tangs to a base having tangs comprising, means for supporting the base and the core loosely assembled therewith with core tangs adjacent base tangs; members adapted to engage the base tangs; means for energizing the coil to clamp an element between the core and an armature supported by the base to assure a space between the core and armature; means for effecting relative movement between the members so that the members will be in abutting positions with respect to the base tangs; electrodes engaging the core tangs; means for forcing the electrodes against the core tangs, and the latter in abutment with the base tangs; and means for supplying electric current to the electrodes to effect a weld between the tangs.

15. Apparatus for welding an electromagnet assembly including a coil and a core having tangs to a base having tangs comprising, means for supporting the base and the core loosely assembled therewith with core tangs adjacent base tangs; members adapted to engage the base tangs; means for energizing the coil to clamp an element between the core and an armature supported by the base to assure a space between the core and armature; electrodes engaging the core tangs; means for moving the electrodes to clamp the core tangs and the base tangs between the electrode and members; and means for supplying electric current to the electrodes to effect a weld between the tangs.

JOHN R. WIRT.
WAYNE H. SHELEY.

REFERENCES CITED

The following references are of record in the file of this patent:

UNITED STATES PATENTS

| Number | Name | Date |
|---|---|---|
| 1,995,759 | Strickland | Mar. 26, 1935 |
| 2,006,459 | Jones et al. | July 2, 1935 |